United States Patent
Madduri et al.

(10) Patent No.: US 10,657,012 B2
(45) Date of Patent: *May 19, 2020

(54) DYNAMICALLY CHANGING MEMBERS OF A CONSENSUS GROUP IN A DISTRIBUTED SELF-HEALING COORDINATION SERVICE

(71) Applicant: Cohesity, Inc., Santa Clara, CA (US)

(72) Inventors: Sashikanth Madduri, Mountain View, CA (US); Mohit Aron, Los Altos, CA (US); Vinay Reddy, San Jose, CA (US); Vipin Gupta, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 15/628,487

(22) Filed: Jun. 20, 2017

(65) Prior Publication Data

US 2017/0344443 A1    Nov. 30, 2017

Related U.S. Application Data

(63) Continuation of application No. 14/334,162, filed on Jul. 17, 2014, now Pat. No. 9,690,675.

(51) Int. Cl.
| | |
|---|---|
| *G06F 11/00* | (2006.01) |
| *G06F 11/20* | (2006.01) |
| *H04L 29/08* | (2006.01) |
| *H04L 12/24* | (2006.01) |
| *H04L 29/14* | (2006.01) |
| *G06F 11/14* | (2006.01) |
| *G06F 11/16* | (2006.01) |

(52) U.S. Cl.
CPC ...... *G06F 11/2005* (2013.01); *G06F 11/1425* (2013.01); *H04L 41/0668* (2013.01); *H04L 41/12* (2013.01); *H04L 41/5009* (2013.01); *H04L 67/10* (2013.01); *H04L 69/40* (2013.01); *G06F 11/1658* (2013.01); *G06F 11/2028* (2013.01); *H04L 41/5096* (2013.01)

(58) Field of Classification Search
CPC ............. G06F 11/2005; G06F 11/2069; G06F 11/3006; G06F 11/0709
See application file for complete search history.

(56) References Cited

U.S. PATENT DOCUMENTS

| | | | |
|---|---|---|---|
| 6,651,242 B1 | 11/2003 | Hebbagodi | |
| 7,185,236 B1* | 2/2007 | Moser | G06F 11/2028 709/209 |

(Continued)

OTHER PUBLICATIONS

International Search Report and Written Opinion dated Sep. 30, 2015 for Application No. PCT/US2015/040289.

*Primary Examiner* — Katherine Lin
(74) *Attorney, Agent, or Firm* — Van Pelt, Yi & James LLP (57) ABSTRACT

Systems, methods, and computer program products for managing a consensus group in a distributed computing cluster, by determining that an instance of an authority module executing on a first node, of a consensus group of nodes in the distributed computing cluster, has failed; and adding, by an instance of the authority module on a second node of the consensus group, a new node to the consensus group to replace the first node. The new node is a node in the computing cluster that was not a member of the consensus group at the time the instance of the authority module executing on the first node is determined to have failed.

18 Claims, 6 Drawing Sheets

(56) References Cited

U.S. PATENT DOCUMENTS

| | | | |
|---|---|---|---|
| 8,654,650 B1* | 2/2014 | Vermeulen | G06F 16/2343 370/241 |
| 2005/0283644 A1 | 12/2005 | Lorch | |
| 2006/0036896 A1 | 2/2006 | Gamache | |
| 2012/0011398 A1 | 1/2012 | Eckhardt | |
| 2012/0110055 A1* | 5/2012 | Van Biljon | G06Q 30/04 709/201 |
| 2013/0060839 A1 | 3/2013 | Van Biljon | |
| 2013/0060929 A1 | 3/2013 | Koponen | |

* cited by examiner

DYNAMICALLY CHANGING MEMBERS OF A CONSENSUS GROUP IN A DISTRIBUTED SELF-HEALING COORDINATION SERVICE

CROSS REFERENCE TO OTHER APPLICATIONS

This application is a continuation of co-pending U.S. patent application Ser. No. 14/334,162 entitled DYNAMICALLY CHANGING MEMBERS OF A CONSENSUS GROUP IN A DISTRIBUTED SELF-HEALING COORDINATION SERVICE filed Jul. 17, 2014 which is incorporated herein by reference for all purposes.

BACKGROUND

Field of the Disclosure

Embodiments presented herein generally relate to distributed computing systems and, more specifically, to dynamically changing members of a consensus group in a distributed self-healing coordination service.

Description of the Related Art

A computing cluster is a distributed system of compute nodes that work together to provide a service that can be viewed as a singular system to nodes outside the cluster. Each node within the cluster can provide the service (or services) to clients outside of the cluster.

A cluster often uses a coordination service to maintain configuration information, perform health monitoring, and provide distributed synchronization. Such a coordination system needs to have a consensus group to reach consensus on values collectively. For example, the consensus group may need to determine which process should be able to commit a transaction to a key value store, or agree which member of the consensus group should be elected as a leader. The consensus group includes of a set of processes that run a consensus algorithm to reach consensus. Traditionally, members of the consensus group in a distributed computing system are fixed as part of the system's external configuration. Failure of a member may not completely prevent operation of the coordination service, but it does decrease the level of fault tolerance of the system. The consensus group has traditionally been unable to automatically add new members to the consensus group if a member of the consensus group has failed. Instead, previous solutions required the failed member of the consensus group to be serviced and restored by an administrator to bring the system back to a steady state.

SUMMARY OF THE DISCLOSURE

One embodiment presented herein includes a method for managing a consensus group in a distributed computing cluster. This method may generally include determining that an instance of an authority module executing on a first node, of a consensus group of nodes in the distributed computing cluster, has failed. This method may also include adding, by an instance of the authority module on a second node of the consensus group, a new node to the consensus group to replace the first node, wherein the new node comprises a node in the computing cluster that was not a member of the consensus group at the time the instance of the authority module executing on the first node is determined to have failed.

In a particular embodiment, the instance of the authority module executing on the second node was elected by members of the consensus group to serve as a master instance of the authority module for the consensus group prior to the failure of the instance of the authority module executing on the first node.

In another embodiment, the instance of the authority module executing on the first node was elected by members of the consensus group to serve as a master instance of the authority module for the consensus group prior to the failure of the instance of the authority module executing on the first node. In this particular embodiment, the method may also include, prior to adding the new node to the consensus group, electing, by remaining members of the consensus group, the instance of the authority module executing on the second node to serve as the master instance of the authority module for the consensus group.

Other embodiments include, without limitation, a computer-readable medium that includes instructions that enable a processing unit to implement one or more aspects of the disclosed methods as well as distributing computing cluster of computing nodes, each having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION OF THE PREFERRED EMBODIMENTS

Embodiments disclosed herein provide self-healing coordination service in a distributed computing cluster which can add or remove compute nodes from a consensus group automatically. Generally, compute nodes may be added or removed from the consensus group for any reason. For example, if a node that is a member of the consensus group fails, another node may be dynamically selected from a set of available nodes, and added to the consensus group. All members of the consensus group can be dynamically replaced with other nodes, enhancing the fault tolerance of the system.

Note, although a secondary storage environment is used as a reference example of a distributed computing cluster, such use should not be considered limiting of the disclosure, as embodiments may be adapted for use with a variety of distributed computing systems or clusters that require coordination services or a consensus group as part of normal operation.

Figure 1A:
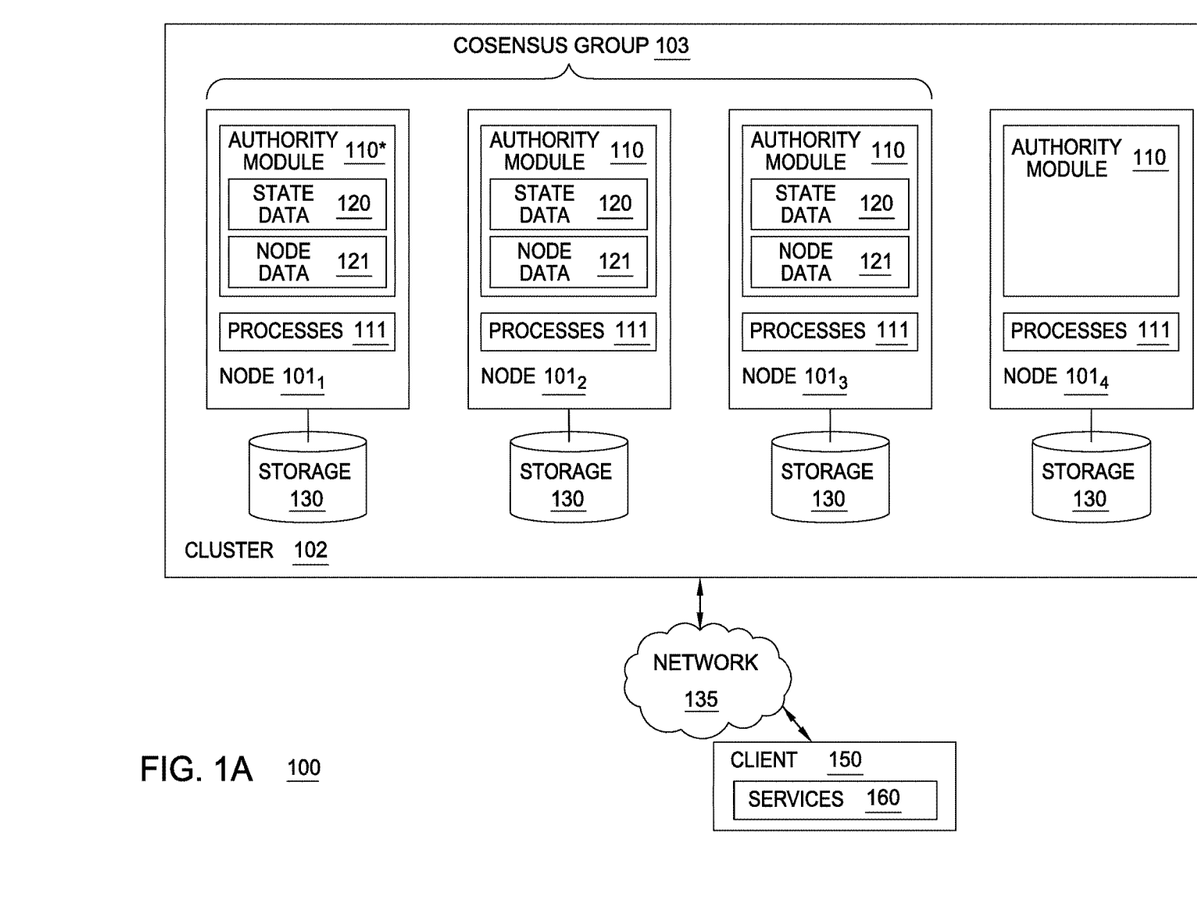
FIGS. 1A-1C illustrate dynamically changing members of a consensus group in a distributed self-healing coordination service, according to one embodiment.

FIG. 1A is a schematic 100 illustrating dynamically changing members of a consensus group in a distributed self-healing coordination service, according to one embodiment. As shown, a cluster 102 includes four compute nodes $101_{1-4}$ connected by a network. Although shown using four compute nodes, cluster 102 may include any number of additional nodes. As shown, each compute node $101_{1-N}$ is connected to storage device 130. In one embodiment, the cluster 102 is a secondary storage environment. Furthermore, as shown, one or more client machines 150 may access applications 160 that access data in the cluster 102 via network 135.

Each node $101_{1-N}$ executes an authority module 110, which is generally configured to assign locks to the processes 111 and manage membership of nodes in the consensus group 103. As shown, the consensus group 103 includes three nodes, namely node $101_{1-3}$. Although depicted as including three members, any number of nodes greater than three may be used as a size of the consensus group 103. The consensus group 103 allows nodes 101 to agree on some value. The authority module 110 on one of the nodes has a special "master" status. This master authority module 110 coordinates the process of reaching consensus with the group. For example, as shown, the authority module 110 of node $101_1$ is starred to indicate that it is the master authority module 110*. The master authority module 110* coordinates the process of reaching consensus within the consensus group 103. The particular node $101_{1-3}$ in the consensus group 103 that is determined to be the "master" is determined by the members of the consensus group 103 each executing a deterministic function. In one embodiment, the deterministic function is an implementation of the Paxos algorithm. Each time a new "master" is elected, that master may serve for a predefined period of time, also referred to as a "lease." When the lease expires, the members of the consensus group 103 may then elect a master authority module 110* from the members of the consensus group 103, which then serves as master for the duration another lease period. However, in one embodiment, once a master authority module 110* is elected, that master authority module 100* pro-actively renews its lease so that it continues to be the master. The lease expires when the master cannot renew it due to failures. Generally, the status of master authority module 110* may transfer between the authority modules 110 executing on each node $101_{1-3}$ of the consensus group 103 over time. For example, after the lease of the authority module 110 executing on node $101_1$ expires, the authority module on node $101_3$ may be appointed master. After the lease of the authority module 110 executing on node $101_3$ expires, the authority module 110 on node $101_2$ (or node $101_1$) may be appointed as master, and so on.

The master authority module 110* serves requests from processes 111 for locks to access data in the storage 130. The processes 111 may be any process that accesses data in the storage 130 (of local or remote nodes 101) in the cluster 102. The master authority module 110*, when issuing a lock to one of the process 111, records an indication of the lock state in the state data 120. More generally, state data 120 maintains a state of all locks in the cluster 102. For redundancy, the master authority module 110* may also share the state data 120 with the other authority modules 110 executing on member nodes of the consensus group 103. The master authority module 110* is further configured to discover new nodes $101_N$ in the cluster 102. In one embodiment, the master authority module 110* discovers new nodes using an implementation of a zero-configuration networking protocol, such as Avahi. In such a case, a new node advertises itself to the cluster, and the master can recognize an advertisement from a new node. When the master authority module 110* discovers a new node, the master authority module 110* updates the node data 121 to reflect the discovery of the new node. The node data 121 is a store generally configured to maintain information regarding each available node $101_N$ in the cluster 102. After updating node data 121, the master authority module 110* distributes the updated node data 121 to the other member nodes of the consensus group 103.

As discussed in greater detail below, when a member of the consensus group 103 fails, the master authority module 110* may dynamically replace the failed member with a new node. If the failed node was executing the master authority module 110*, then once the lease on master authority status expires, the remaining nodes in the consensus group 103 elect a new master authority module 110*. After electing a new master authority module 110, a new node is selected to replace the failed node.

Figure 1B:
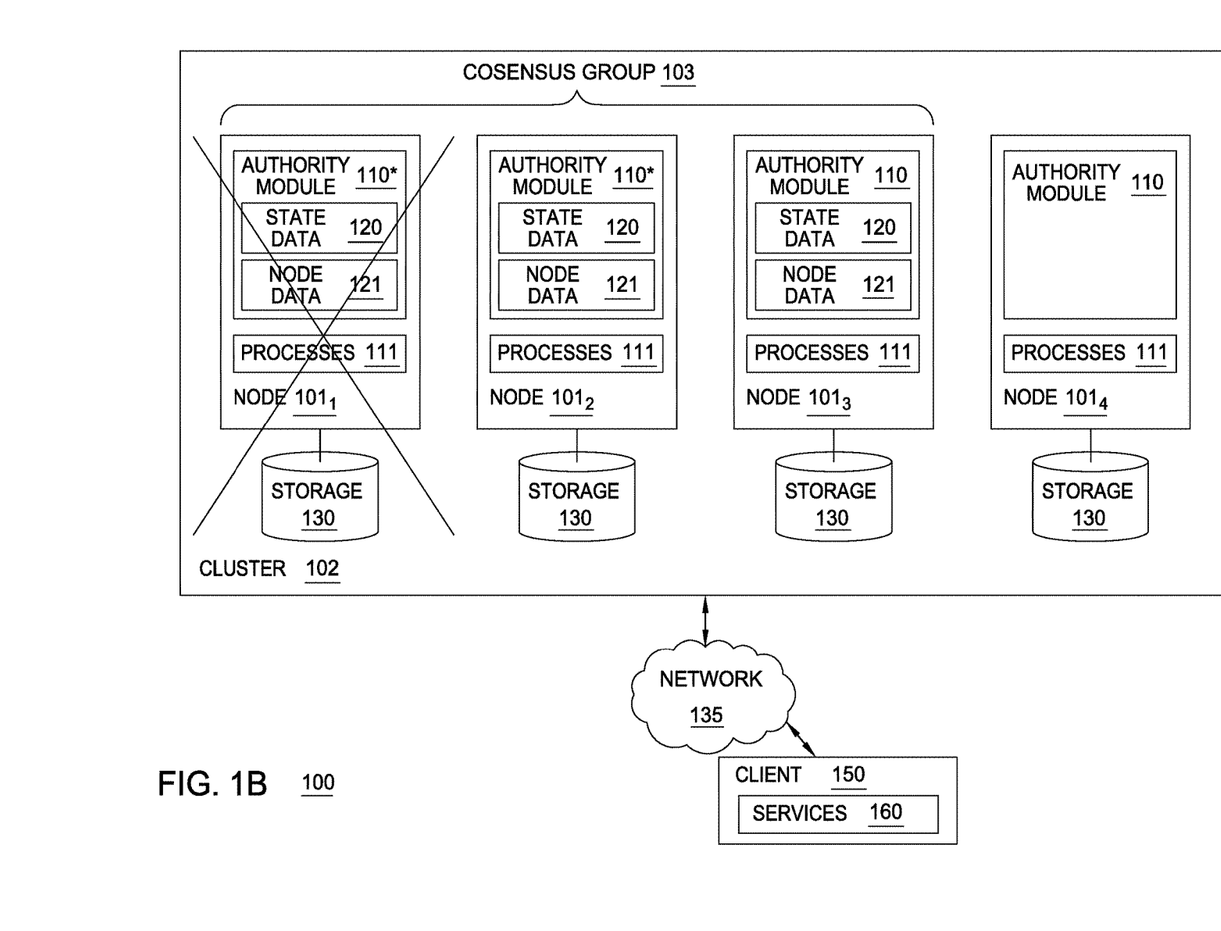

FIG. 1B illustrates the cluster 102 after node $101_1$ fails (or the master authority module 110* otherwise becomes unavailable), according to one embodiment. After the lease held by authority module 110* expires, the remaining nodes (nodes $101_2$ and $101_3$) start the process of electing a new master. In at least one embodiment, the nodes $101_{2-3}$ execute an implementation of the Paxos algorithm to elect a new master authority module 110*. More generally, a majority of the remaining nodes in the consensus group elect one member as hosting the master authority module 110*. As shown, the node $101_2$ has been elected to host the master authority module 110*. When the new master authority module 110* is elected, node $101_2$ may send a multicast message to all other nodes $101_{1-N}$ in the cluster 102 indicating that it hosts the master authority module 110*. For example, the node $101_2$ may send a multicast message including its own Internet Protocol (IP) address as hosting the master authority module 110*. Doing so allows the processes 111 on other nodes $101_{3-N}$ to know that the master authority module 110* is now hosted on node $101_2$, and that any requests should be sent to node the master authority module 110* on node $101_2$. However, although a new master authority module 110* has been elected, the consensus group 103 only has two members, as node $101_1$ has not been replaced.

Figure 1C:
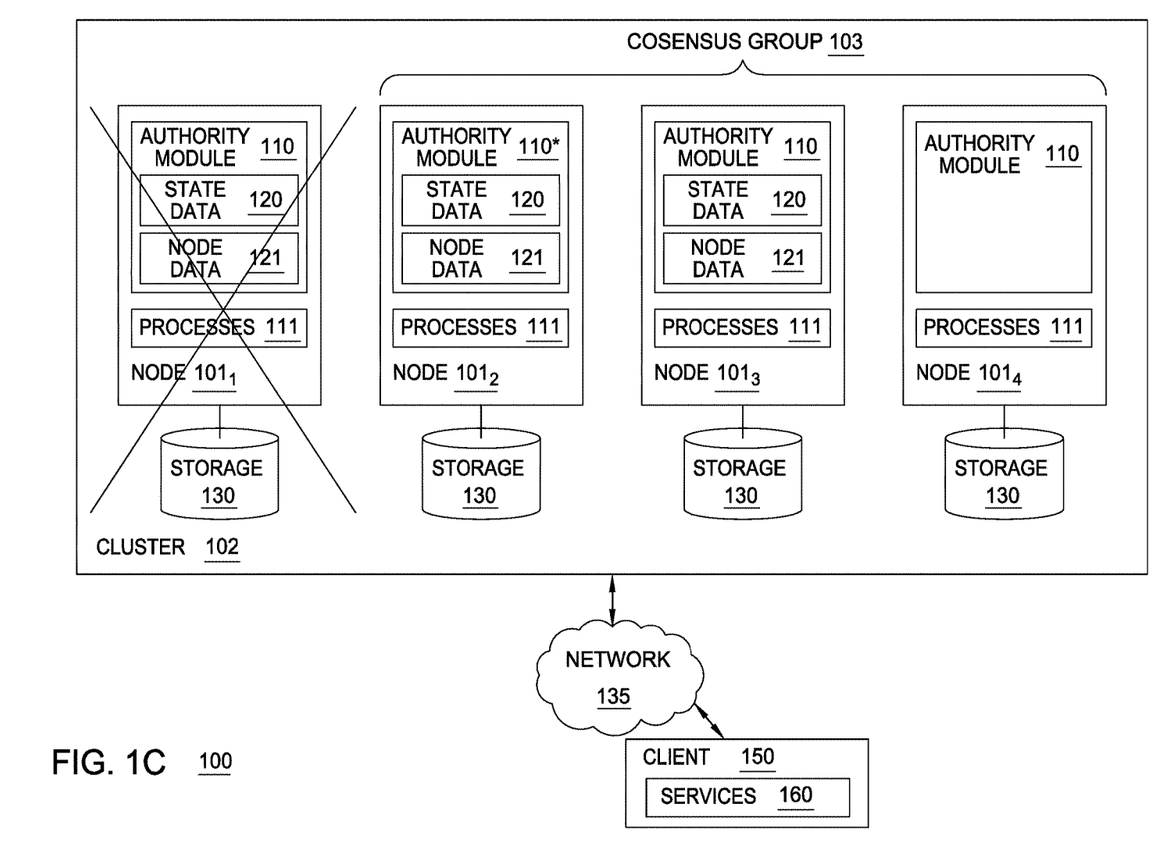

FIG. 10 illustrates the addition of a new node to the consensus group 103, according to one embodiment. As shown, the master authority module 110* has added node $101_4$ to the consensus group 103. To add the node $101_4$ to the consensus group 103, the master authority module 110* may choose the node $101_4$ from the node data 121, which specifies the available nodes in the cluster 102. The master authority module 110* may choose any node from the node data 121 based on any criteria. Once the master authority module 110* determines to include node $101_4$, the master authority module 110* invites the node $101_4$ to the consensus group 103. When the node $101_4$ accepts the invitation, the master authority module 110* shares the state data 120 and the node data 121 to the node $101_4$.

Figure 2:
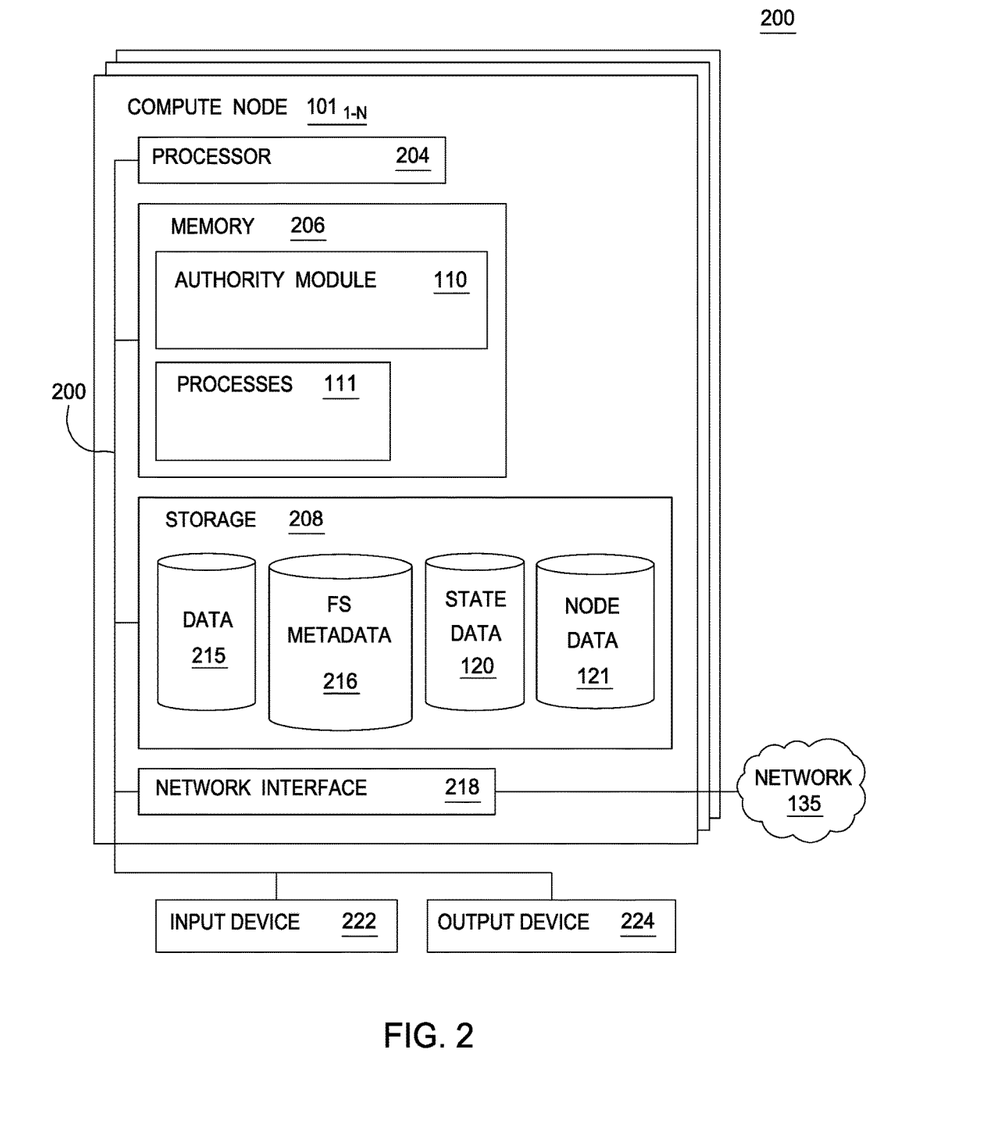
FIG. 2 illustrates a system for dynamically changing members of a consensus group in a distributed self-healing coordination service, according to one embodiment.

FIG. 2 illustrates a system 200 for dynamically changing members of a consensus group in a distributed self-healing coordination service, according to one embodiment. The networked system 200 includes a plurality of compute nodes $101_{1-N}$ connected via a network 135. In general, the network 135 may be a telecommunications network and/or a wide area network (WAN). In a particular embodiment, the network 135 is the Internet. In at least one embodiment, the system 200 is a distributed secondary storage environment.

The compute nodes $101_{1-N}$ generally include a processor 204 connected via a bus 220 to a memory 206, a network interface device 218, a storage 208, an input device 222, and an output device 224. The compute nodes $101_{1-N}$ are generally under the control of an operating system (not shown). Examples of operating systems include the UNIX operating system, versions of the Microsoft Windows operating system, and distributions of the Linux operating system. More generally, any operating system supporting the functions disclosed herein may be used. The processor 204 is included to be representative of a single CPU, multiple CPUs, a single CPU having multiple processing cores, and the like. The network interface device 218 may be any type of network communications device allowing the compute nodes $101_{1-N}$ to communicate via the network 230.

The storage 208 may be a persistent storage device. Although the storage 208 is shown as a single unit, the storage 208 may be a combination of fixed and/or removable storage devices, such as fixed disc drives, solid state drives, SAN storage, NAS storage, etc. The storage 208 may be local or remote to the compute nodes $101_{1-N}$, and each compute node $101_{1-N}$ may include multiple storage devices.

The input device 222 may be used to provide input to the computer 202, e.g., a keyboard and a mouse. The output device 224 may be any device for providing output to a user of the computer 202. For example, the output device 224 may be any display monitor.

As shown, the memory 206 includes the authority module 110 and the processes 111, described in detail above. Generally, the authority module 110 is a may provide a distributed lock manager that can dynamically add or remove members from a consensus group of nodes. The authority module 110 is further configured to manage locks within the system 200, representations of which may be stored in the state data 120. In some embodiments, three of the compute nodes 101 form a consensus group that reaches consensus to make decisions in the system 200. For example, the consensus group must reach consensus as to which node 101 hosts the master authority module 110*. Generally, any number of compute nodes may form a consensus group. More specifically, for a system to tolerate at least n failures, the consensus group needs to have at least 2n+1 members. Any decision needs to be agreed upon by a majority. Thus, to withstand a failure of 1 node, the system needs at least 3 nodes (but could have more) and 2 nodes can provide a majority for decision making. However, suppose the consensus group includes four nodes. In that case, the majority required for decisions is 3 nodes and the system can still handle one failure.

When the lease period for the current master authority module 110* expires, or the node hosting the current master authority module 110* fails, or the current master authority module 110 is otherwise not available, the remaining nodes $101_{1-N}$ in the consensus group elect one of themselves (and/or their instance of the authority module 110) as the new master authority module 110*. In at least some embodiments, the remaining nodes in the consensus group must reach a consensus that the current master authority module 110* is no longer available, or the host node $101_N$ of the current master authority module 110* has failed prior to electing a new master authority module 110*. In at least one embodiment, the nodes $101_{1-N}$ in the consensus group use an implementation of the Paxos algorithm to elect a new master authority module 110*.

As indicated, the authority module 110 may dynamically add and/or remove nodes from the consensus group. Generally, the master authority module 110* maintains a list of free nodes, which may be stored in any format in the node data 121. The master authority module 110* may share the data in the node data 121 with other nodes in the consensus group. The master authority module 110* may use a zero configuration protocol, e.g., Avahi, to discover new nodes in the system 200. Upon discovering a new node, the master authority module 110* may update the node data 121 to reflect the presence of the new node in the system 200. The master authority module 110* may then share the updated node data 121 with other members of the consensus group.

If a member of the consensus group needs to be replaced, the master authority module 110* may select an available node from the node data 121. The master authority module 110* may then invite the new node to the consensus group. When the new node is added to the consensus group, the master authority module 110* may transfer the state data 120 and the node data 121 to the node added as a member of the consensus group. The master authority module 110* may repeat this process as necessary to maintain the desired number of nodes serving as members in the consensus group. In a larger consensus group, for example, more failures in the consensus group may be tolerated. When a node in a larger consensus group fails, the remaining nodes in the consensus group must reach consensus that the node has failed. The master authority module 110* may then remove the node, and add a new node to the consensus group from the group of available compute nodes.

As shown, the storage 208 includes the data 215, file system (FS) metadata 216, the state data 120, and the node data 121. The data 215 includes the actual data stored and managed by the nodes $101_{1-N}$ in the in the system 200. The metadata 216 is the metadata for a distributed file system and includes information such as file sizes, directory structures, file permissions, physical storage locations of the files, and the like.

Figure 3:
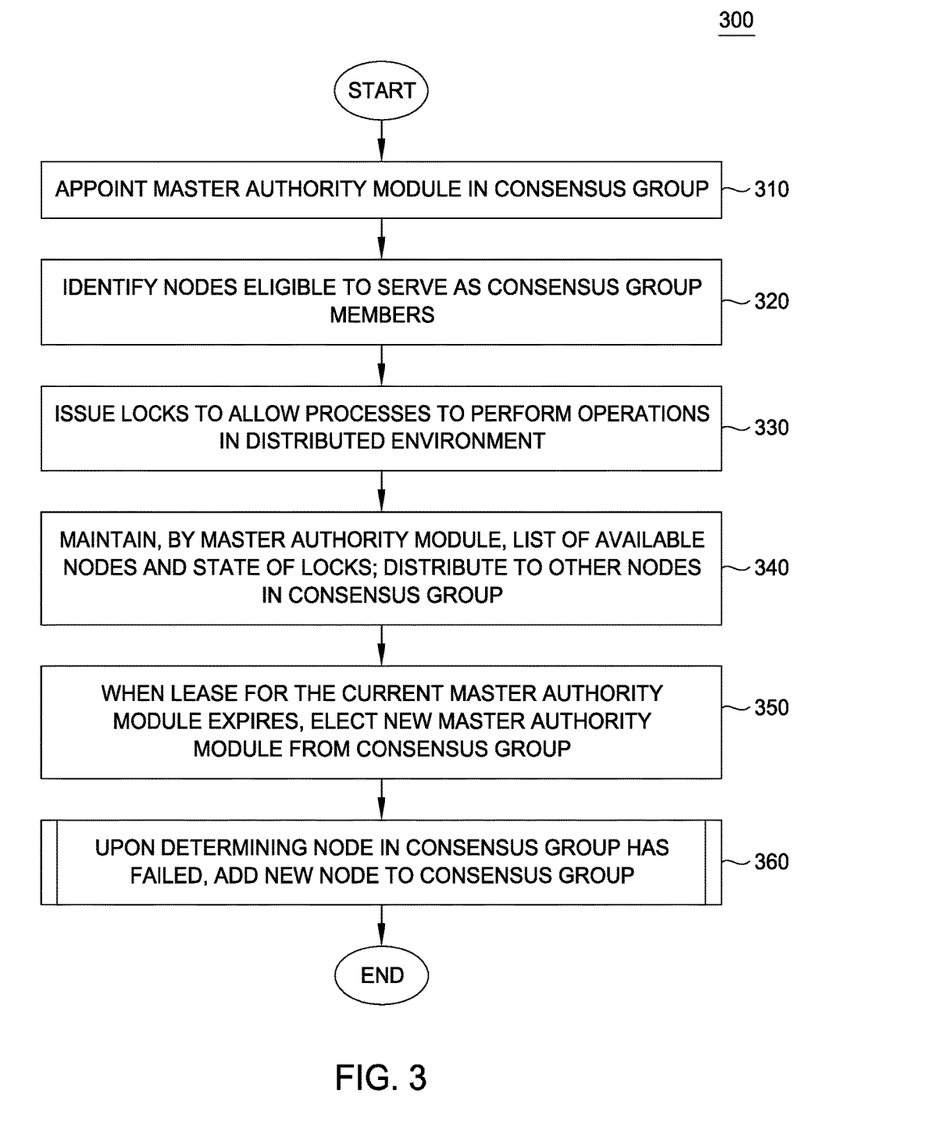
FIG. 3 illustrates a method to dynamically change members of a consensus group, according to one embodiment.

FIG. 3 is a flow diagram illustrating a method 300 to dynamically change members of a consensus group, according to one embodiment. Generally, the steps of the method 300 provide a self-healing coordination service that allows member nodes which provide the service to be dynamically added or removed from a consensus group. In at least some embodiments, the authority module 110 (or the master authority module 110*) performs the steps of the method 300.

At step 310, the authority modules 110 executing on the nodes in the consensus group reach consensus to appoint a master authority module 110*. In at least one embodiment, the authority modules 110 in the consensus group use an implementation of the Paxos algorithm to elect a master authority module 110*. When the master authority module 110* is elected, a multicast message including the IP address of the master authority module 110* is transmitted to each node in the cluster. At the time of initial cluster configuration, for example, the authority modules 110 executing on the compute nodes in the consensus group may determine that a master has not been appointed. In such a "cold start" scenario, the authority modules 110 in the consensus group reach consensus (using the Paxos algorithm) to appoint a master authority module 110*. At step 320, the master authority module 110* may identify nodes which can be a member of the consensus group. Generally, the master authority module 110* may discover new nodes as they are added to a cluster of nodes. In at least one embodiment, the master authority module 110* can recognize advertisements from nodes service to discover new nodes. When a new node is discovered, the master authority module 110* may add identification information for the new node to the node data 121 and share the updated node data 121 with other members of the consensus group.

At step 330, the master authority module 110* may issue locks to allow processes to perform operations on items in storage in the secondary storage environment. At step 340, the master authority module 110* maintains the set of available nodes in the node data 121 and the state of locks in the state data 120. The master authority module 110* may also share the state data 120 and the node data 121 with other members of the consensus group. At step 350, when the lease for the current master authority module 110* expires, the remaining nodes of the consensus group may elect a new master authority module 110* from the authority modules 110 executing on the remaining nodes of the consensus group. As previously indicated, once a master authority module 110* has been elected, that master authority module 110* may proactively renew its lease so that it continues to serve as the master authority module 110*. The lease may expire when the current master authority module 110* fails to renew its lease. The current master authority module 110* may fail to renew its lease for any reason, such as when the node hosting the master authority module 110* fails, the master authority module 110* itself fails, or the node or the master authority module 110* is otherwise unavailable. The authority modules 110 executing on the nodes in the consensus group may implement a version of the Paxos algorithm to elect a new master authority module 110*.

At step 360, upon determining a node in the consensus group has failed, the master authority module 110* may heal the consensus group by adding additional nodes to the consensus group. Generally, at step 360, any time a node in the consensus group fails or is otherwise unreachable, the master authority module 110* may select a new node from the set of nodes in the node data 121, and invite that node to the consensus group. When the new node joins the consensus group, the master authority module 110* transfers the state data 120 and the node data 121 to the new node. In at least some embodiments, a size (or a number of members) of the consensus group may be defined as a system parameter. Whenever the consensus group has a number of members that does not equal the predefined size, the consensus group may be healed by adding new members according to the described techniques.

Figure 4:
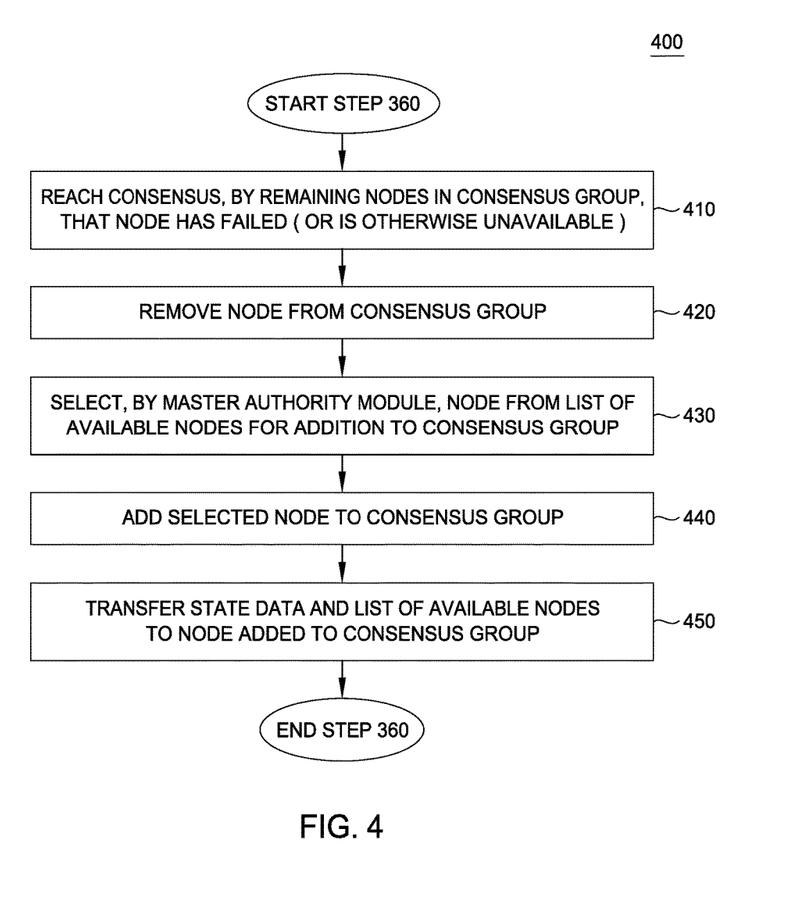
FIG. 4 illustrates a method to add a node to a consensus group, according to one embodiment.

FIG. 4 is a flow diagram illustrating a method 400 corresponding to step 360 to add a new node to a consensus group, according to one embodiment. In at least some embodiments, the master authority module 110* performs the steps of the method 400. In executing the steps of the method 400, the master authority module 110* may dynamically add and remove nodes to heal the consensus group in the distributed system after an authority module on one of the nodes fails (or node hosting the authority module fails). Further, nodes may be removed from the consensus group if it is performing inconsistently such that removing the node would improve the functioning of the consensus group. At step 410, the master authority module 110* may determine that a node in the consensus group has failed (or is otherwise unavailable). As noted, the master authority module 110* could also determine that a member of consensus group is performing poorly or erratically and should be removed from the consensus group and replaced. At step 420, the master authority module 110* reaches consensus with the remaining nodes in the consensus group to remove the failed node from the consensus group. At step 430, the master authority module 110* selects a new node from the set of available nodes to add to the consensus group. At step 440, the master authority module 110* invites the node selected at step 420 to the consensus group and add the new node to the consensus group. At step 450, the master authority module 110* transfers state data 120 and the set of available nodes in the node data 121 to the node added to the consensus group at step 440.

Advantageously, embodiments disclosed herein provide a self-healing coordination service that can dynamically add and remove members from a consensus group. The new nodes may be added to the consensus group without having to repair or service failed nodes. Generally, any available machine in the distributed system may be dynamically added to the consensus group. In adding new members to maintain the requisite number of nodes in the consensus group, the consensus group may continue to make progress in reaching consensus in the distributed system.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the authority module 110 could execute on a computing system in the cloud and dynamically add or remove nodes from a consensus group of nodes. In such a case, the authority module 110 could discover new nodes and store a list of available nodes at a storage location in the cloud. Doing so allows a user to access this information from any computing system attached to a network connected to the cloud (e.g., the Internet).

The foregoing description, for purpose of explanation, has been described with reference to specific embodiments. However, the illustrative discussions above are not intended to be exhaustive or to limit the disclosure to the precise forms disclosed. Many modifications and variations are possible in view of the above While the foregoing is directed to embodiments of the present disclosure, other and further embodiments of the disclosure may be devised without departing from the basic scope thereof, and the scope thereof is determined by the claims that follow.

What is claimed is:

1. A method for managing a consensus group of nodes in a distributed computing cluster, the method comprising:
    reaching a first consensus, based on at least two members of the consensus group of nodes in the distributed computing cluster, to elect an instance of an authority module executing on a first node of the consensus group of nodes, to serve as a master instance of the authority module for the consensus group of nodes, wherein each member of the consensus group of nodes executes a respective instance of the authority module, and the master instance of the authority module is configured to assign locks to processes executing in the distributed computing cluster;
    reaching a second consensus, based on at least two members of the consensus group of nodes, that the instance of the authority module executing on the first node of the consensus group of nodes, has failed;
    reaching a third consensus, based on at least two not failed members of the consensus group of nodes, to elect the instance of the authority module executing on a second node of the consensus group of nodes to serve as the master instance of the authority module for the consensus group;
    receiving, by the master authority module on the second node, a communication from a new node in the distributed computing cluster, wherein the new node comprises a node in the distributed computing cluster that was not a member of the consensus group at a time the at least two members of the consensus group of nodes reached the second consensus that the instance of the authority module executing on the first node failed;
    adding, by the master authority module on the second node, the new node to the consensus group; and
    sending to the new node, an identification of a set of nodes in the distributed computing cluster eligible to join the consensus group.

2. The method of claim 1, wherein the communication from the new node in the computing cluster advertises the new node in the computing cluster.

3. The method of claim 1, further comprising sending to the new node, a state of a set of locks issued to nodes in the distributed computing cluster.

4. The method of claim 1, further comprising sending, by the instance of the authority module on the second node, to each node in the distributed computing cluster, an indication that the instance of the authority module on the second node has been elected as the master authority module for the consensus group, wherein the locks are required to access data in a storage device and the distributed computing cluster comprises a secondary storage environment.

5. The method of claim 1, further comprising:
    adding, by the master authority module on second node, the new node to a set of available nodes in the distributed computing cluster; and
    sharing the set of available nodes with members of the consensus group.

6. The method of claim 1, further comprising removing, by the second node, the first node from the consensus group.

7. A system for managing a consensus group of node in a distributed computing cluster, comprising:
    one or more processors configured to:
        reach a first consensus, based on at least two members of the consensus group of nodes in the distributed computing cluster, to elect an instance of an authority module executing on a first node of the consensus group of nodes, to serve as a master instance of the authority module for the consensus group of nodes, wherein each member of the consensus group of nodes executes a respective instance of the authority module, and the master instance of the authority module is configured to assign locks to processes executing in the distributed computing cluster;
        reach a second consensus, based on at least two members of the consensus group of nodes, that the instance of the authority module executing on the first node of the consensus group of nodes, has failed;
        reach a third consensus, based on at least two not failed members of the consensus group of nodes, to elect the instance of the authority module executing on a second node of the consensus group of nodes to serve as the master instance of the authority module for the consensus group;
        receive, by the master authority module on the second node, a communication from a new node in the distributed computing cluster, wherein the new node comprises a node in the distributed computing cluster that was not a member of the consensus group at a time the at least two members of the consensus group of nodes reached the second consensus that the instance of the authority module executing on the first node failed; and add, by the master authority module on the second node, the new node to the consensus group;

send to the new node, an identification of a set of nodes in the distributed computing cluster eligible to join the consensus group; and one or more memory coupled to the one or more processors and configured to provide the one or more processors with instructions.

8. The system of claim 7, wherein the communication from the new node in the distributed computing cluster advertises the new node in the distributed computing cluster.

9. The system of claim 7, wherein the one or more processors are further configured to send to the new node, a state of a set of locks issued to nodes in the distributed computing cluster.

10. The system of claim 7, wherein the one or more processors are further configured to send, by the instance of the authority module on the second node, to each node in the distributed computing cluster, an indication that the instance of the authority module on the second node has been elected as the master authority module for the consensus group, wherein the locks are required to access data in a storage device and the distributed computing cluster comprises a secondary storage environment.

11. The system of claim 8, wherein the one or more processors are further configured to:

add, by the master authority module on second node, the new node to a set of available nodes in the distributed computing cluster; and share the set of available nodes with members of the consensus group.

12. The system of claim 7, wherein the one or more processors are further configured to remove the first node from the consensus group.

13. A computer program product for managing a consensus group of nodes in a distributed computing cluster, the computer program product being embodied in a non-transitory computer readable storage medium and comprising computer instructions for:

reaching a first consensus, based on at least two members of the consensus group of nodes in the distributed computing cluster, to elect an instance of an authority module executing on a first node of the consensus group of nodes, to serve as a master instance of the authority module for the consensus group of nodes, wherein each member of the consensus group of nodes executes a respective instance of the authority module, and the master instance of the authority module is configured to assign locks to processes executing in the distributed computing cluster;

reaching a second consensus, based on at least two members of the consensus group of nodes, that the instance of the authority module executing on the first node of the consensus group of nodes, has failed;

reaching a third consensus, based on at least two not failed members of the consensus group of nodes, to elect the instance of the authority module executing on a second node of the consensus group of nodes to serve as the master instance of the authority module for the consensus group;

receiving, by the master authority module on the second node, a communication from a new node in the distributed computing cluster, wherein the new node comprises a node in the distributed computing cluster that was not a member of the consensus group at a time the at least two members of the consensus group of nodes reached the second consensus that the instance of the authority module executing on the first node failed;

adding, by the master authority module on the second node, the new node to the consensus group; and sending to the new node, an identification of a set of nodes in the distributed computing cluster eligible to join the consensus group.

14. The computer program product of claim 13, wherein the communication from the new node in the distributed computing cluster advertises the new node in the distributed computing cluster.

15. The computer program product of claim 13, further comprising computer instructions for sending to the new node, a state of a set of locks issued to nodes in the distributed computing cluster.

16. The computer program product of claim 13, further comprising computer instructions for sending, by the instance of the authority module on the second node, to each node in the distributed computing cluster, an indication that the instance of the authority module on the second node has been elected as the master authority module for the consensus group, wherein the locks are required to access data in a storage device and the distributed computing cluster comprises a secondary storage environment.

17. The computer program product of claim 13, further comprising computer instructions for:

adding, by the master authority module on second node, the new node to a set of available nodes in the distributed computing cluster; and sharing the set of available nodes with members of the consensus group.

18. The computer program product of claim 13, further comprising computer instructions for removing, by the second node, the first node from the consensus group.

* * * * *